United States Patent
Misawa

(10) Patent No.: US 7,426,341 B2
(45) Date of Patent: Sep. 16, 2008

(54) IMAGING DEVICE

(75) Inventor: Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 531 days.

(21) Appl. No.: 11/237,878

(22) Filed: Sep. 29, 2005

(65) Prior Publication Data

US 2006/0067670 A1 Mar. 30, 2006

(30) Foreign Application Priority Data

Sep. 30, 2004 (JP) ............................. 2004-288536

(51) Int. Cl.
*G03B 7/00* (2006.01)
(52) U.S. Cl. ...................................... 396/226; 348/362
(58) Field of Classification Search ................. 396/164, 396/166, 213, 222, 226; 348/221.1, 229.1, 348/231.3, 234, 362, 364, 366
See application file for complete search history.

(56) References Cited

U.S. PATENT DOCUMENTS

2006/0082675 A1* 4/2006 McGarvey et al. .......... 348/362

FOREIGN PATENT DOCUMENTS

| JP | 2002-135648 A | 5/2002 |
| JP | 2003-223387 A | 8/2003 |

* cited by examiner

*Primary Examiner*—Rodney E Fuller
(74) *Attorney, Agent, or Firm*—Birch, Stewart, Kolasch & Birch, LLP

(57) ABSTRACT

When a release button is pressed halfway after setting a digital still camera in a sequential shooting mode, photometric elements measure brightness values from sixteen photometric divisions (V1 to V16) of an image shooting field, to obtain brightness distribution of the image shooting field. The brightness distribution is compared with the latitude of an image sensor. If the brightness distribution is wider than the latitude, the number of shoots to be made at one sequential shooting is determined by the ratio of the brightness distribution to the latitude. According to the number of shoots, differences in exposure amount between the exposures are determined. Then exposure conditions such as the aperture size and the exposure time are determined according to the different exposure amounts for the respective exposures. Upon the release button being fully pressed, the given number of shoots are made in continuous succession under the different exposure conditions.

12 Claims, 4 Drawing Sheets

IMAGING DEVICE

FIELD OF THE INVENTION

The present invention relates to an imaging device that automatically adjusts exposure conditions to a subject to capture an optical image of the subject.

BACKGROUND ARTS

Digital still cameras have been widely known as an imaging device that converts an optical image of a subject into an image signal through an image sensor such as a CCD image sensor or a CMOS image sensor, and records the image signal as a digital still image at a high resolution on a storage medium such as a non-volatile memory. Recent digital still cameras generally use an image sensor of a high pixel number, i.e. one or two million pixels, which permits recording a super fine image. On the other hand, as the number of pixels of the image sensor increases, dynamic range of the image sensor is more limited, so is the brightness range in which the gradation can be exactly reproduced. As a result, the gradation becomes flat in high-light portions or in shadow portions of an image captured from a scene or subject whose brightness is diverse, which damages the image quality.

In order to compensate for the image deterioration due to the limited dynamic range of the image sensor, some prior arts suggest making exposures a number of times per one subject while varying exposure amounts step by step, see Japanese Laid-open Patent Application Nos. 2003-223387 and 2002-135648.

According to these prior arts, however, the number of shoots per one scene is decided by the width of brightness distribution range of the scene, so that the shooting number per one scene can be so large that a large capacity storage medium is necessary for storing the image data.

SUMMARY OF THE INVENTION

In view of the foregoing, a primary object of the present invention is to provide an imaging device that permits recording an image with a high gradation reproduction while minimizing the number of requisite shoots.

To achieve the above and other objects, an imaging device of the present invention comprises an image sensor for photoelectrically converting an optical image of a subject to output an image signal; a photometry device for measuring brightness of an image shooting field to detect a brightness distribution in the image shooting field; a memory storing data of a latitude that represents a range from a minimum brightness to a maximum brightness detectable through the image sensor; and an exposure condition deciding device that compares the brightness distribution in the image shooting field with the latitude of the image sensor, to decide exposure conditions based on a result of the comparison and the information of the brightness.

The photometry device preferably comprises divisional photometric elements for measuring brightness respectively from a plural number of divisions of the image shooting field, to detect the brightness distribution in the image shooting field by respective photometric values of the divisions output from the photometric elements. The exposure condition deciding device decides exposure conditions based on the information of the brightness and a relative width of the brightness distribution to the latitude of the image sensor. The information of the brightness is maximum value and minimum value of the brightness.

According to a preferred embodiment, the imaging device further comprises a sequential shooting device for capturing a number of image frames sequentially from one image shooting field while varying exposure conditions so as to differentiate exposure amounts by a constant amount from each other. According to this embodiment, the exposure condition deciding device decides, when the brightness distribution is wider than the latitude of the image sensor, the number of sequential shoots to be made by the sequential shooting device and the respective exposure conditions for these exposures based on the width of the brightness distribution and a ratio of the width of the brightness distribution to the latitude of the image sensor.

According to another preferred embodiment, the imaging device further comprises a subject discrimination device for discriminating based on the image signal such kinds of subjects that are predetermined to have priority over other subjects, wherein, if the brightness distribution is wider than the latitude of the image sensor, the exposure condition deciding device calculates an average photometric value in the image shooting field after weighting photometric values of those of the divisions which contain any of the predetermined kinds of subjects more than photometric values of other divisions, and decides exposure conditions to be proper for the average photometric value.

According to a further embodiment, the imaging device further comprises a judgment device for judging by the brightness distribution as to whether to supplement subject brightness with a flash light or not, wherein the exposure condition deciding device calculates a flash light amount based on such exposure conditions that are determined according to a photometric value of a selected one of the divisions.

Because the exposure conditions, including the number of requisite shoots and exposure amounts for the respective exposures, are decided based on the latitude of the image sensor that is defined by the dynamic range of the image sensor as well as the brightness distribution of the image shooting field, it becomes possible to set the number of shoots to be made at gradually varied exposure amounts as small as possible for such a scene whose brightness distribution is wide, i.e. where the brightness values of the subjects divert widely. Therefore, the present invention saves the capacity of a storage medium for the image data.

By discriminating such kinds of subjects that are predetermined to have priority over others, and weighting photometric values of the predetermined kinds of subjects more than photometric values of other subjects on calculating a proper exposure amount, it becomes possible to capture an image with a properly exposed main subject even while the brightness distribution leans to one side, i.e. to the side of a high brightness range or a low brightness range.

BRIEF DESCRIPTION OF THE DRAWINGS

The above and other objects and advantages will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1:
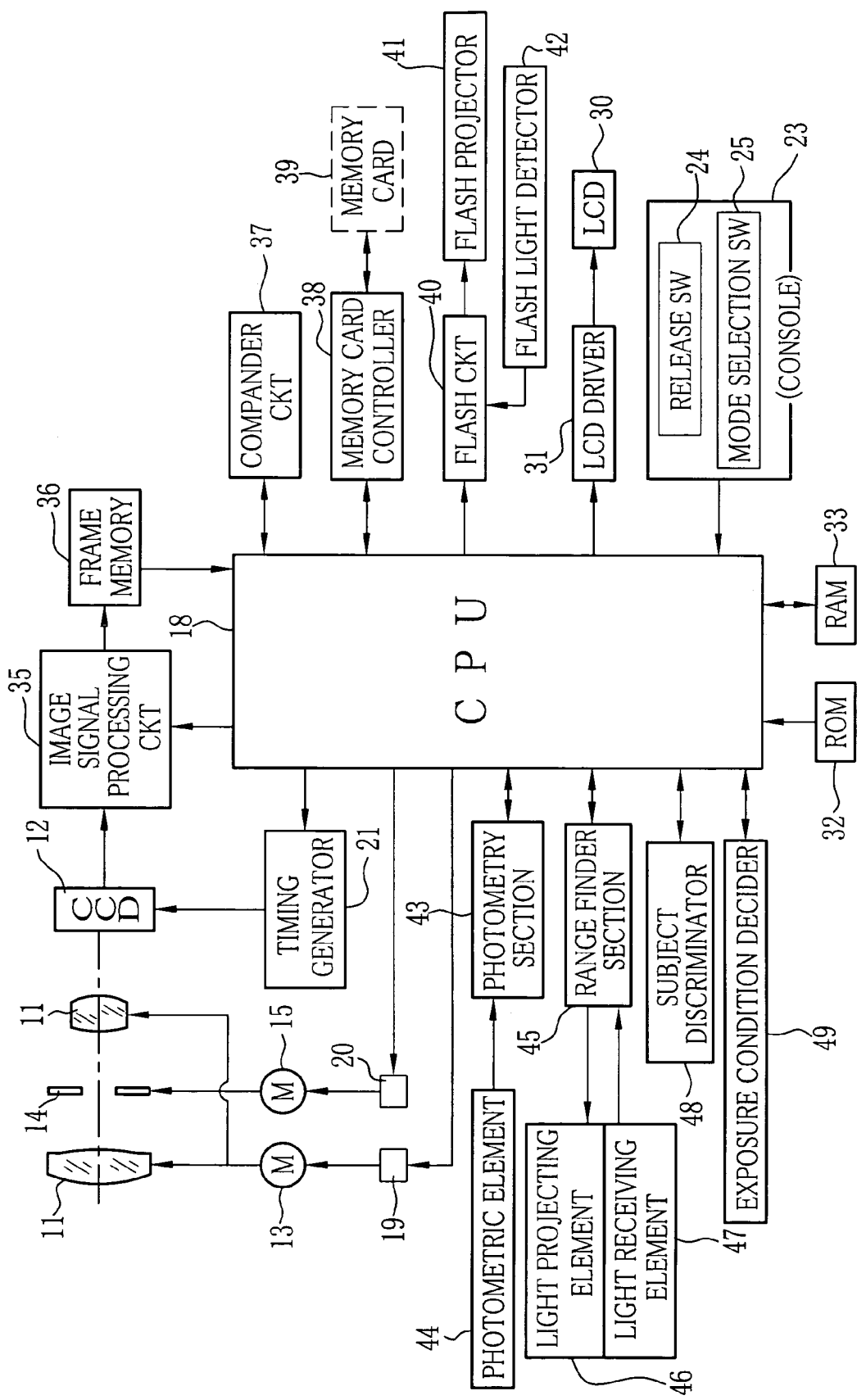
FIG. 1 is a block diagram illustrating the circuitry of a digital still camera according to an embodiment of the present invention.

In FIG. 1, a digital still camera 10 is provided with a taking lens 11 consisting of a zoom lens system, and a CCD image sensor 12. The taking lens 11 is movable in an axial direction by use of a driving power supplied from a lens motor 13, to change distances between lens elements for focusing or zooming. The taking lens 11 is provided with a stop 14. The stop 14 can change its aperture size by use of a driving power supplied from an iris motor 15, to adjust light amount that comes from a subject and travels through the taking lens 11.

The lens motor 13 and the iris motor 15 consist of a stepping motor each, and are driven by drive pulses which are supplied respectively from motor drivers 19 and 20 under the control of a CPU 18. With reference to driven amounts of the respective motors 13 and 15, the CPU 18 continually monitors the focusing position and the zooming position of the taking lens 11 as well as the aperture size of the stop 14.

The CCD image sensor 12 has an imaging surface that consists of a large number of light receiving elements arranged in a two-dimensional matrix. An optical image of a subject is formed through the taking lens 11 on the imaging surface, so the image sensor 12 converts the optical image into an electronic image. That is, the light receiving elements accumulate electric charges corresponding to the light amounts received thereon, and transfer them as an image signal of one frame from the CCD image sensor 12 to an image signal processing circuit 35. The timing of charge transfer is decided by a clock pulse signal applied from a timing generator 21 to the CCD image sensor 12, so that the CCD image sensor 12 captures images at a given frame rate. The timing of charge transfer defines the time duration of charge accumulation, i.e. the exposure time. Therefore the CCD image sensor 12 has a function of electronic shutter.

A console 23 consists of a release switch 24 for detecting a shooting operation, a mode selection switch 25 for switching over between an imaging mode and a reproduction mode, a not-shown zoom key for zooming, a not-shown power switch and other operation keys. The console 23 feeds an operation signal to the CPU 18 each time any of the keys and the switches is operated. The release switch 24 is turned on as a not-shown release button is pressed down, thereby detecting a half-pressed position and a full-pressed position of the release button. When the release button is pressed halfway, the digital still camera 10 prepares for the shooting by executing an automatic exposure control (AE) and an automatic focusing (AF). When the release button is fully pressed, an image is recorded.

The mode selection switch 25 is operated to switch over between the imaging mode and the reproduction mode of the digital still camera 10. The reproduction mode is for reproducing recorded images. The imaging mode includes a standard shooting mode, a sequential shooting mode and other operation modes, so that any one of these operation modes is selected to carry out an appropriate imaging operation. In the standard shooting mode, a frame of image is recorded upon each shooting operation, i.e. each time the release button is pressed fully. In the sequential shooting mode, a number of image frames are sequentially recorded upon each shooting operation. In the sequential shooting mode, it is also possible to choose whether to set an auto-bracket function active or not. The auto-bracket function permits recording a number of images while varying the exposure amount step by step.

A liquid crystal display (LCD) 30 is used for displaying recorded images in the reproduction mode. In the imaging mode, the LCD 30 serves as an electronic viewfinder for displaying the image of the subject that is photoelectrically detected through the CCD image sensor 12. An LCD driver 31 generates a drive signal for driving liquid crystal elements of the LCD 30 to display the image thereon.

The CPU 18 executes control programs stored in a ROM 32 while monitoring the operation signals entered through the console 23, to transmit control commands to respective portions of the digital still camera 10 so as to control the digital still camera 10 electrically. A RAM 33 serves as a work memory for the CPU 18 to store the control programs and set-up data as read from the ROM 32, computed values and the like.

The image signal is fed from the CCD image sensor 12 to the image signal processing circuit 35, to be processed for noise-reduction, amplification, gamma-correction, white balance adjustment and other signal processing. The signal processing for correcting image quality, including the gamma-correction and the white balance adjustment, may be skipped by revising set-up conditions. The image signal processing circuit 35 converts the processed image signal into digital image data, and outputs the image data sequentially to a frame memory 36.

The frame memory 36 stores the image data frame by frame. The frame memory 36 can store a given number of frames of image data, so the image data of the first stored frame is deleted each time the image data of the latest frame is written on the frame memory 36.

A compander circuit 37 compresses the image data according to a predetermined lossy compression format, e.g. JPEG format, to reduce data capacity. The compander circuit 37 also expands the compressed image data to restore the image data. A memory card controller 38 controls writing and reading of data on a memory card 39. The memory card 39 is a storage medium removably attached to the digital still camera 10, so as to record the image data as captured upon each shooting operation.

A flash circuit 40 activates a flash projector 41 to project a flash of light toward the subject to make up for a lack of subject brightness. Flash charging, discharge-triggering, interruption of flashing and other operations of the flash circuit 40 are controlled by the CPU 18. A flash light detector 42 consists of a photo diode, for example, to detect the flash light reflected from the subject. Based on photoelectric current obtained through the flash light detector 42, the flash circuit 40 detects the amount of the flash light, to stop the light projection from the flash projector 41 when the flash light amount reaches a value predetermined by a command from the CPU 18.

Figure 2:
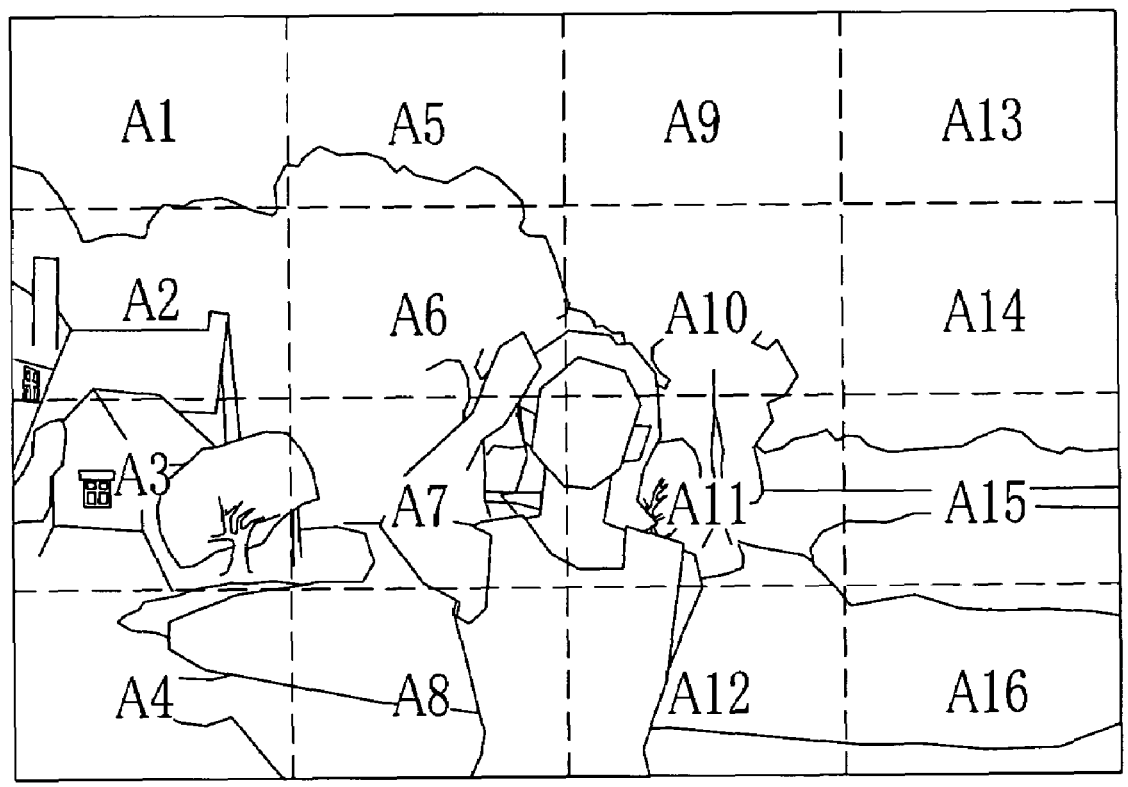
FIG. 2 is an explanatory diagram illustrating photometric divisions in an image shooting field.

A photometry section 43 measures brightness of an image shooting field through photometric elements 44 that receive light from the subject. In order to obtain brightness values from sixteen divisions A1 to A16 of the image shooting field, as divided into four columns and four rows as shown in FIG. 2, the photometric elements 44 consists of sixteen light receiving elements allocated to the respective divisions A1 to A16. The photometry section 43 reads out the image data from the frame memory 36, to extract brightness data of each pixel to measure the brightness of the image shooting field. The brightness measurement from the image data is carried out on each of the divisions A1 to A16, like the photometric elements 44 do. That is, a photometric value representative of the brightness of each of the divisions A1 to A16 is obtained by accumulating brightness data of those pixels which belong to the same division. The photometry section 43 sends the CPU 18 the photometric values obtained through the photometric elements 44 as well as the photometric values obtained from the image data.

A range finder section 45 sequentially reads out the image data from the frame memory 36 while the taking lens 11 is being focused, and evaluates contrast of each image frame, thereby to detect a focusing position where the taking lens 11 forms the sharpest optical image on the imaging surface of the CCD image sensor 12. In order to determine subject distance in a dark scene, like in a night shooting, the digital still camera 10 is also provided with a light projecting element 46 for projecting ultra red beams and a light receiving element 47 as a position sensing device, to calculate the subject distance according to the well-known trigonometric distance measurement method.

A main subject discriminator 48 is set up with parameters relating to particular subjects which are often held as a main subject on shooting. Persons and plants can be mentioned as exemplars of such subjects. The main subject discriminator 48 determines based on the image data what kinds of subjects are contained in the image shooting field. The subject discriminator 48 carries out both color discrimination and contour discrimination to discriminate the subjects with high reliability. For the color discrimination, color data of each pixel is extracted from the image data, to determine the main subject by those pixels representative of a color component that takes up a large percentage in the image. For the contour definition, those portions of the image where brightness largely changes are extracted as contours of the subjects based on brightness data, and the subjects are classified according to the extracted contour.

An exposure condition decider 49 decides exposure conditions based on the photometric values measured by the photometry section 43. The exposure conditions are defined by the aperture size of the stop 14 and the exposure time of the electronic shutter of the CCD image sensor 12. In a case where the flash light is to be projected to make up for a lack of light, that is, to supplement the subject brightness, the exposure condition decider 49 decides the flash light amount in combination with the aperture size and the exposure time.

The ROM 32 memorizes latitude data of the CCD image sensor 12. The latitude data shows a range from a minimum brightness to a maximum brightness that the CCD image sensor 12 can detect. The latitude data is read by the CPU 18 and is referred to by the exposure condition decider 49. The exposure condition decider 49 derives a brightness distribution in the image shooting field from the photometric values of the divisions A1 to A16, which are measured by the photometric elements 44, and the exposure condition decider 49 checks if the brightness distribution is wider than the latitude of the CCD image sensor 12. Where the brightness distribution is wider than the latitude of the CCD image sensor 12, exposure conditions suitable for the scene are determined according to the photographic modes.

Figure 3:
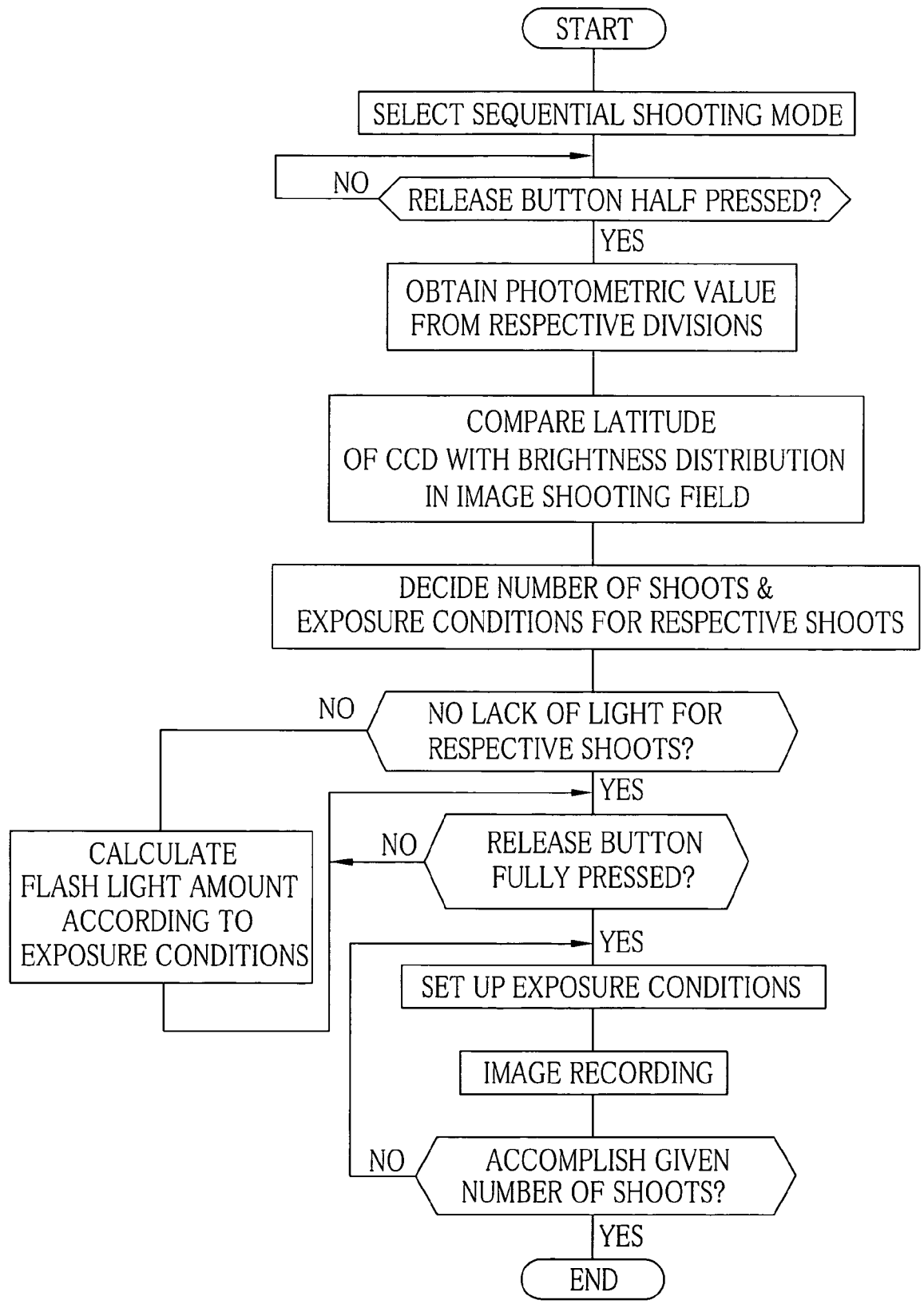
FIG. 3 is a flowchart illustrating an operation in a sequential shooting mode.

Now the operation of the digital still camera 10 will be described with reference to a flow chart of FIG. 3. When the mode selection switch 25 is operated to set the digital still camera 10 at the sequential shooting mode, the CCD image sensor 12 converts the optical image as formed through the taking lens 11 on the imaging surface into the image signal, and outputs the image signal to the frame memory 36 to store it frame by frame. When the release switch 24 detects that the release button is pressed halfway, the CPU 18 sends the motor driver 19 a command to drive the lens motor 13 for focusing the taking lens 11.

The CPU 18 also sends a command to the photometry section 43 to let the photometry section 43 make photometric operations through the photometric elements 44. Then the photometry section 43 outputs respective photometric values measured on the divisions A1 to A16 of the image shooting field to the CPU 18. If at that time the auto bracket function is ON, the exposure condition decider 49 decides three combinations of exposure conditions that provide three shoots amounts: one corresponds to a proper exposure value EV for an average of the photometric values, a second corresponds to an exposure value +1EV, which is twice the exposure amount to the proper exposure value, and a third corresponds to an exposure value −1EV, which is half the exposure amount to the proper exposure value. When the release switch 24 detects that the release button is pressed fully, the CPU 18 drives the iris motor 15 to adjust the aperture size of the stop 14 to the respective exposure conditions. As a result, three image frames captured under the respective exposure condition are recorded. It is to be noted that the number of frames to be captured at the sequential shooting as well as the difference in exposure amount from the proper exposure value may be changed by the photographer through the console 23.

If the auto bracket function is OFF, the CPU 18 sends the latitude data of the CCD image sensor 12, as read out from the ROM 32, and the photometric values of the sixteen divisions A1 to A16 to the exposure condition decider 49. The exposure condition decider 49 derives the brightness distribution of the image shooting field from the photometric values, and checks if the brightness distribution is wider than the latitude of the CCD image sensor 12. In a case where the brightness distribution is narrower than the latitude of the CCD image sensor 12, the exposure condition decider 49 decides exposure conditions that provide a proper exposure amount for the average of the photometric values. When the release switch 24 detects that the release button is pressed fully, three image frames are taken under the same exposure conditions.

In a case where the brightness distribution is wider than the latitude of the CCD image sensor 12, the exposure condition decider 49 calculates differences from the proper exposure amount according to the ratio of the brightness distribution to the latitude of the CCD image sensor 12. For example, if the latitude of the CCD image sensor 12 is 4EV wide, whereas the brightness distribution of the image shooting field is 12EV wide, the exposure condition decider 49 decides three sets of exposure conditions, which differ from each other by 4EV in exposure amount, for three times of exposures. The number of shoots per one image shooting operation is decided by the ratio of the subject brightness distribution to the width of the latitude of the CCD image sensor 12. That is, if the subject brightness distribution is three to four times the width of the latitude of the CCD image sensor 12, the shooting are to be done four times upon each exposure operation. If the subject brightness distribution is four to five times the width of the latitude of the CCD image sensor 12, the shooting are to be done five times. As the number of shoots and a constant difference in exposure amount between these exposures are calculated, exposure conditions are determined to cover a high brightness range, a middle brightness range and a low brightness range of the image shooting field respectively in the latitude of the CCD image sensor 12. Then the corresponding number of image frames to the determined shooting number are captured and recorded under the different exposure conditions. The image frames obtained sequentially from the same subject in this way are processed or edited through a personal computer or the like, to synthesize properly exposed portions of the respective image frames to compose an image with a high gradation reproduction. If one of the images contains a properly exposed main subject, the one image is used without making any image composition. It is possible to configure the digital camera so as to execute the image composing inside the camera.

To capture an image so that the high brightness range of the image shooting field is covered with the latitude of the CCD image sensor 12, exposure conditions are defined by a small aperture size of the stop 14 and a short exposure time. If the image obtained under these exposure conditions will be underexposed in the middle brightness range and the low brightness range, the CPU 18 activates the flash circuit 40. Therefore, the exposure condition decider 49 determines, after calculating the numbers of shoots and the differences in exposure amount between the exposures, if it is necessary to supplement the subject brightness with the flash light at the respective exposures. If yes, the exposure condition decider 49 calculates an appropriate light amount based on the aperture size of the stop 14 and the subject distance which is measured by the light projecting element 46 and the light receiving element 47. The flash projector 41 stops projecting the flash light when a predetermined amount of flash light has been projected. In this way, a properly exposed image is obtained even while differences in exposure amount are large between the exposures for the sequential shooting.

Figure 4:
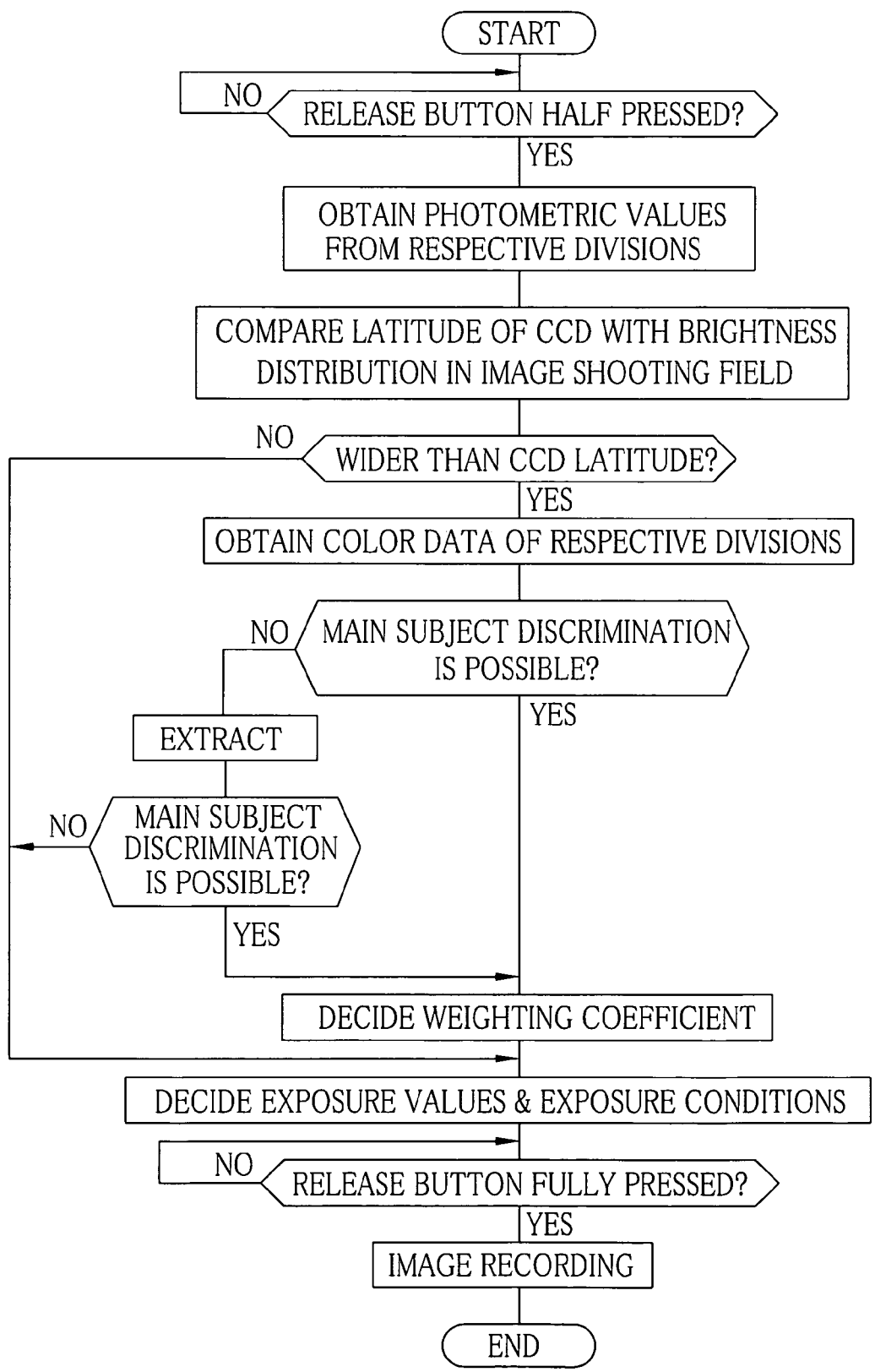
FIG. 4 is a flowchart illustrating an operation in a standard shooting mode.

If the standard shooting mode is selected when the release switch 24 detects the half-pressing of the release button, as shown in FIG. 4, the CPU 18 compares the brightness range of the image shooting field with the latitude of the CCD image sensor 12. If the brightness range of the image shooting field is narrower than the latitude of the CCD image sensor 12, the exposure condition decider 49 decides exposure conditions based on an average of photometric values of the divisions A1 to A16. Then the CPU 18 controls the respective portions of the digital still camera 10 so as to satisfy the exposure conditions, and records an image upon the release switch 24 detects the full-pressing of the release button.

If, on the contrary, the brightness range of the image shooting field is wider than the latitude of the CCD image sensor 12, the subject discriminator 48 is activated. The subject discriminator 48 reads out image data from the frame memory 36 and extracts color data of each pixel, to discriminate a main subject. After determining what kind of main subject is contained, the subject discriminator 48 determines which of the divisions A1 to A16 the main subject is located in. Then the exposure condition decider 49 weights the photometric value of each of those divisions which contain the main subject five times the photometric values of other divisions, before calculating an average photometric value of the image shooting field. Based on the average photometric value, the exposure condition decider 49 decides exposure conditions. Upon the release button being pressed to the full, an image is recorded under the decided exposure conditions to take the main subject at a proper exposure.

In a case where the color data is not useful for discriminating the main subject, for example, because the main subject is back lit and shadowed, contours of the subjects in the image are extracted to discriminate the subjects. After a main subject is determined, photometric values of those divisions which contain the main subject are weighted prior to deciding exposure conditions in the same way as above. If it is impossible to discriminate the main subject in either way, the exposure conditions are decided based a simple average of the photometric values of the divisions A1 to A16. In addition to that, whenever the main subject is not discriminated, the flash circuit 40 is activated to project a flash light to satisfy the exposure conditions. Thereby, the flash light is automatically projected in those scenes where the subject brightness is too low to discriminate the subject, for example, at night.

Although the present invention has been described with respect to the preferred embodiment, the present invention is not to be limited to the digital still camera, but is applicable to any kinds of imaging devices, including a digital camera with a movie shooting function or a video camera that records moving images as analog signal. Although the exposure time, i.e. the time duration for charge accumulation, is controlled by use of the electronic shutter of the CCD image sensor in the above embodiment, it is possible to provide the imaging device with a mechanical shutter to control the exposure time by closing the mechanical shutter. As the image sensor, a CMOS type image sensor is usable instead of the CCD image sensor. The photometric elements may be CCD type light receiving elements as they have a wider dynamic range and work with less number of elements, i.e. with less pixel number. To detect the brightness distribution of the image shooting field, other devices than the photometric elements are usable. For example, it is possible to make a plural number of preparatory shootings under different exposure conditions with gradually varied aperture size and/or exposure time, till upper and lower limits of the subject brightness go in the latitude of the image sensor, and thereafter, determine the brightness distribution by executing logarithmic operations on photometric values obtained from brightness data of respective pixels, in accordance with the exposure conditions.

In decision of exposure condition, a result of the comparison between the brightness distribution and the latitude of the image sensor, and information of the brightness are used. At least two information of the brightness in the division is used, for example, maximum value and minimum value of the brightness may be used. Moreover, average value, maximum value and minimum value of the brightness may be used.

Thus, the present invention is not to be limited to the above embodiment but, on the contrary, various modifications will be possible without departing from the scope of claims appended hereto.

What is claimed is:

1. An imaging device comprising:
   an image sensor for photoelectrically converting an optical image of a subject to output an image signal;
   a photometry device for measuring brightness of an image shooting field to detect a brightness distribution in said image shooting field;
   a memory storing data of a latitude that represents a range from a minimum brightness to a maximum brightness detectable through said image sensor; and
   an exposure condition deciding device that compares said brightness distribution in said image shooting field with the latitude of said image sensor, to decide exposure conditions based on a result of the comparison and information of said brightness.

2. An imaging device as claimed in claim 1, wherein said photometry device comprises divisional photometric elements for measuring brightness respectively from a plural number of divisions of said image shooting field, to detect said brightness distribution in said image shooting field by respective photometric values of said divisions output from said photometric elements.

3. An imaging device as claimed in claim 2, wherein said exposure condition deciding device decides exposure conditions based on said information of said brightness and a relative width of said brightness distribution to the latitude of said image sensor.

4. An imaging device as claimed in claim 3, wherein said information of said brightness is maximum value and minimum value of said brightness.

5. An imaging device as claimed in claim 2, further comprising a subject discrimination device for discriminating based on said image signal such kinds of subjects that are predetermined to have priority over other subjects, wherein, if said brightness distribution is wider than the latitude of said image sensor, said exposure condition deciding device calculates an average photometric value in said image shooting field after weighting photometric values of those of said divisions which contain any of said predetermined kinds of subjects more than photometric values of other divisions, and decides exposure conditions to be proper for said average photometric value.

6. An imaging device as claimed in claim 5, wherein said subject discrimination device discriminates the subjects based on color data contained in said image signal.

7. An imaging device as claimed in claim 5, wherein said subject discrimination device carries out contour extraction based on brightness data contained in said image signal, to discriminate the subjects by the extracted contours.

8. An imaging device as claimed in claim 2, further comprising a judgment device for judging by said brightness distribution as to whether to supplement subject brightness with a flash light or not, wherein said exposure condition deciding device calculates a flash light amount based on such exposure conditions that are determined according to a photometric value of a selected one of said divisions.

9. An imaging device as claimed in claim 1, further comprising a sequential shooting device for capturing a number of image frames sequentially from one image shooting field while varying exposure conditions so as to differentiate exposure amounts by a constant amount from each other, wherein said exposure condition deciding device decides, when said brightness distribution is wider than the latitude of said image sensor, the number of sequential shoots to be made by said sequential shooting device and the respective exposure conditions for these exposures based on the width of said brightness distribution and a ratio of the width of said brightness distribution to the latitude of said image sensor.

10. An imaging device as claimed in claim 9, further comprising a signal processing device for composing image signals of said sequential image frames as captured through said sequential shooting device, to obtain an image with a high gradation reproduction.

11. An imaging device as claimed in claim 9, further comprising a subject discrimination device for discriminating based on said image signal such kinds of subjects that are predetermined to have priority over other subjects, wherein an image frame where any of said predetermined kinds of subjects is properly exposed is selected from among said sequential image frames as captured through said sequential shooting device.

12. An imaging device as claimed in claim 1, further comprising a judgment device for judging by said brightness distribution as to whether to supplement subject brightness with a flash light or not.

* * * * *